United States Patent [19]

Eilers

[11] Patent Number: 4,499,603

[45] Date of Patent: Feb. 12, 1985

[54] RADIO RECEIVER WITH RECEPTION-READINESS MONITORING FEATURE AND METHOD

[75] Inventor: Norbert Eilers, Hildesheim, Fed. Rep. of Germany

[73] Assignee: Blaupunkt Werke GmbH, Hildesheim, Fed. Rep. of Germany

[21] Appl. No.: 478,070

[22] Filed: Mar. 23, 1983

[30] Foreign Application Priority Data

Mar. 31, 1982 [DE] Fed. Rep. of Germany ....... 3211813

[51] Int. Cl.3 .............................................. H04B 1/26

[52] U.S. Cl. ............................... 455/205; 340/825.72; 340/825.73; 455/45; 455/228

[58] Field of Search ................. 455/67, 226, 227, 228, 455/45, 205, 35, 36; 340/539, 825.72, 825.73

[56] References Cited

U.S. PATENT DOCUMENTS 3,949,401 4/1976 Hegeler et al. ..................... 455/227
4,435,843 3/1984 Eilers et al. ......................... 455/228
4,450,589 5/1984 Eilers et al. ......................... 455/228

FOREIGN PATENT DOCUMENTS 2428131 4/1975 Fed. Rep. of Germany .
2460983 7/1976 Fed. Rep. of Germany ...... 455/228
3121087 12/1982 Fed. Rep. of Germany .
0021711 2/1977 Japan .................................. 455/228

*Primary Examiner*—Marc E. Bookbinder
*Attorney, Agent, or Firm*—Frishauf, Holtz, Goodman & Woodward

[57] ABSTRACT

To monitor the operability of a radio receiver which has special recognition circuitry to recognize warning or emergency announcements, a modulation detector (11) is provided, sensing the change in degree of modulation of a region recognition (RR) signal, which changes its degree of modulation when an announcement recognition (AR) signal is radiated, the degree-of-modulation signal being stored in a memory (flip-flop 12), the output of which controls a transfer switch (6). The transfer switch transfers output from a muting stage (5) in the receiver, which is disabled upon detection of the AR frequency to a tone generator, for application to the amplifier of a warning tone if no change in the degree of modulation of the RR signal has been detected within a predetermined time period, as determined by a timing stage (15). A suitable timing interval is, for example, 24 hours. If such timing signals are received, the tone generator is not enabled, however.

6 Claims, 1 Drawing Figure

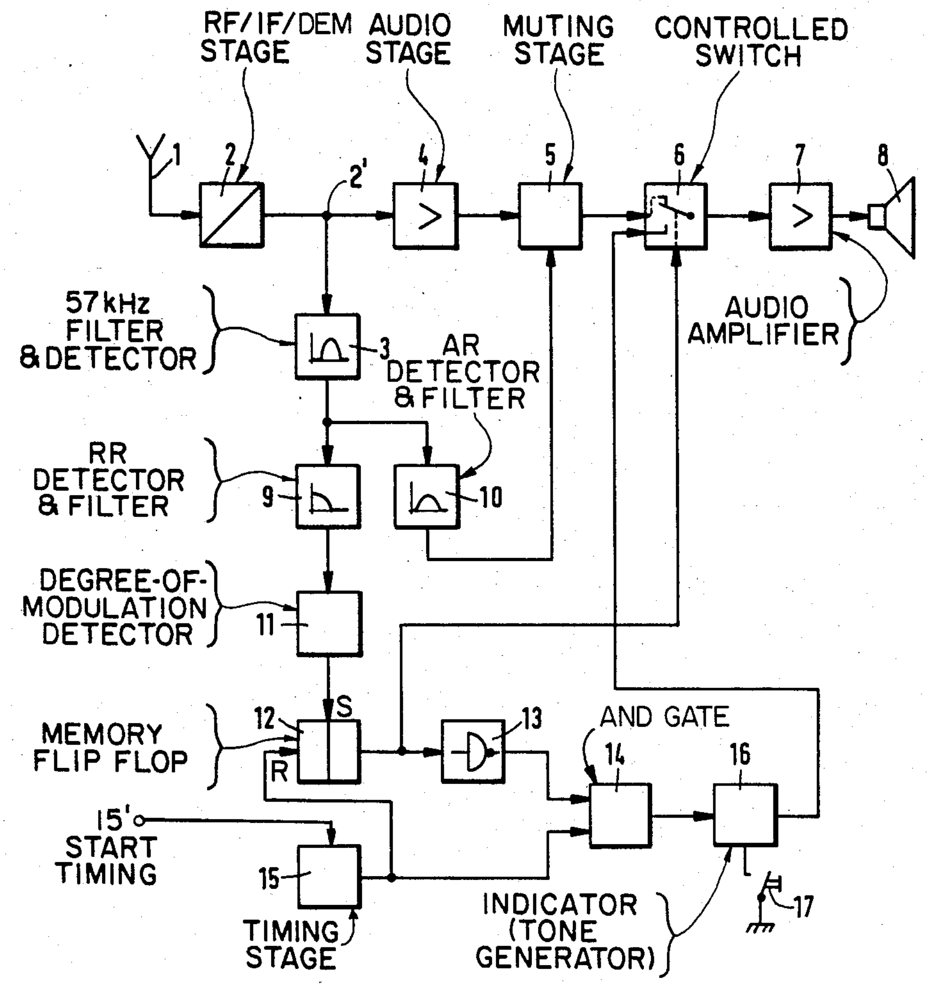
RF/IF/DEM STAGE
AUDIO STAGE
MUTING STAGE
CONTROLLED SWITCH
1
2
2'
4
5
6
7
8
57kHz FILTER & DETECTOR
3
AR DETECTOR & FILTER
AUDIO AMPLIFIER
RR DETECTOR & FILTER
9
10
DEGREE-OF-MODULATION DETECTOR
11
MEMORY FLIP FLOP
12
S
R
13
AND GATE
14
16
15'
START TIMING
15
TIMING STAGE
INDICATOR (TONE GENERATOR)
17

RADIO RECEIVER WITH RECEPTION-READINESS MONITORING FEATURE AND METHOD

Reference to related patent and applications, assigned to the assignee of the present invention, the disclosure of which is hereby incorporated by reference: U.S. Ser. No. 319,653, filed Nov. 9, 1981, Eilers and Brägas; U.S. Ser. No. 319,654, filed Nov. 9, 1981, Eilers and Brägas now U.S. Pat. No. 4,435,843; U.S. Ser. No. 319,655, filed Nov. 9, 1981, Eilers and Brägas now U.S. Pat. No. 4,450,589; U.S. Pat. No. 3,949,401, Hegeler et al, issued Apr. 6, 1976. Reference to related disclosure: German Published Patent Application DE-AS No. 24/28 131; "Apparatus for Control of Audio Reproduction of a Receiver"; Narbaits-Jaureguy et al.

The present invention relates to radio receivers, and more particularly to radio receivers which have the capability of receiving special announcements broadcast by a radio station, the special announcements being characterized by simultaneous of a subcarrier which is amplitude-modulated with a signal characterizing or specially indicating that a special announcement is being transmitted.

BACKGROUND

The referenced U.S. Pat. No. 3,949,401, Hegeler et al, describes a radio transmission system, and a receiver for use therein, which is capable of decoding transmissions radiated on a separate subcarrier to indicate that a radio station is about to make, or making, a special announcement, for example a traffic warning, accident or other emergency reports, or, if desired, sports or news announcements, or the like. The receiver, of course being tuned to the particular station, may not have previously reproduced the radiated program, however, but, rather, may have only used its audio section for reproduction, for example, of an audio program previously recorded on magnetic tape and being reproduced from a magnetic cassette or cartridge which is scanned by an appropriate transducer section of a combination cassette/-cartridge radio receiver. Thus, the user, who may not be interested in the particular program being broadcast by the transmitter, can listen to the program in accordance with the user's preference, as determined by reproduction from the tape—or, for example, from a different radio station with a separate tuner—although the user may be interested in receiving all the announcements being broadcast by the radio station. Under ordinary operation of the system, that is, if no special announcement is being radiated, the audio portion of the receiver is muted. The audio amplification stage may be used for reproduction of a tape-recorded program, or may be muted as well.

It has previously been proposed to monitor the capability of the muted radio receiver to receive radiated signals; German Pat. No. 24 28 131 describes such a system. In the system of this German patent, a manually operated switch is provided which, in case the radio receiver is muted, places a voltage on an indicator panel which includes indicator lamps if an announcement recognition signal is detected by a decoder coupled to the tuner of the radio receiver.

The switch permits, or blocks automatic cancellation of muting. This cancellation of muting is, normally, controlled by the announcement recognition signal, as decoded by the decoder. For details of the decoding, reference is made to the aforementioned Hegeler patent. The manually operated switch permits—upon operation—that the muting circuit is enabled, rather than being automatically disabled by decoding of the announcement recognition signal, and the receiver muted—or, for example, a tape-recorded program again enabled if the user is not interested in listening to the specific announcement. Since, frequently, announcements are repeated from time to time, or are played from an automatically repeating tape, the listener, after once having heard an announcement, may wish to revert to complete muting, or another program. Yet, the indicator lamp will indicate that an announcement continues to be broadcast, in case the listener wishes to hear it again, and, by a second operation of the switch, inhibit the muting of the receiver.

Traffic announcement system in which the receiver can be used have been developed to discriminate between various types of announcements; the respective types of announcements are assigned separate modulating frequencies which, by amplitude modulation (AM) modulate a subcarrier, typically of 57 kHz, which is frequency modulated on the main carrier of the frequency modulation (FM) transmitter station to which the receiver is tuned. One of the modulating frequencies ($f_0$) may be assigned warning or emergency announcements, which should be heard by all listeners; other frequencies ($f_1$; . . . ) may be assigned different announcements, for example traffic announcements or sports or news reports. For a detailed description, reference is made to the referenced application U.S. Ser. No. 319,653, Eilers et al.

It is, of course, necessary that the receiver be operable to receive warning or emergency information. It may happen that, for an extended period of time, no warning or emergency information will be radiated. It is no possible to test the receptivity of the receiver, then, to such warning information. Of course, it would be possible to repeatedly, for example at recurring intervals, radiate the particular frequency ($f_0$) associated with warning information. To test receptivity, however, it will be necessary that the user be present, and has the radio connected at the time this test signal is being radiated-which cannot always be presumed.

THE INVENTION

It is an object to provide a system in which the capability of the receiver to receive warning or emergency information is monitored independently of the presence of a user, and without transmitting or radiating test signals from the transmitter stations.

Briefly, the degree of modulation of the subcarrier by a region recognition (RR) signal, characterizing, by the frequency of the RR signal, a specific radio station within a region which is capable of radiating the announcements is checked; if the modulation degree of the subcarrier by the RR signal changes abruptly, a signal is provided which is stored in a memory element. The memory element is connected to a timing circuit, for example a ring counter, which controls the memory to provide a read-out signal indicative of failure to store an RR signal change during the timing period. The timing period may, for example, be 24 hours. An indicator is provided, providing an indicator output whether a read-out signal has been received. Thus, the indicator will show if a signal has been received, that is, that the receiver is in operative condition to receive an announcement, since the degree of modulation of the region recognition or RR signal changes abruptly when an announcement is being broadcast.

The particular announcement, which may be characterized by the modulation frequency of the subcarrier, is not then material, and need not be listened to. Yet, the operability of the receiver has been monitored.

The system has the advantage that it operates independently of presence of a user to test operability of the equipment during radiation of the announcement—-which may occur only infrequently—and additionally does not require radiation of warning frequency ($f_0$) by a transmitter station. Abrupt changes of modulation degree of the subcarrier need be done only if no warning announcement or no traffic announcement or other reports at all are being broadcast within, for example, a 24-hour period.

DRAWING

The single FIGURE is a block circuit diagram of the elements of a receiver in accordance with the present invention.

DETAILED DESCRIPTION OF THE INVENTION

An antenna 1 receives FM signals radiated by a transmitter. The transmitter radiates a carrier, at its assigned carrier frequency, and a subcarrier, for example of 57 kHz, frequency modulated on the assigned carrier frequency. In addition, the 57 kHz subcarrier is amplitude modulated by a specific frequency (RR), which may be in the order of between 20 Hz to 120 Hz, characterizing specific radio stations, within specific regions which radiate the announcements as FM signals on the assigned carrier frequency. To characterize that a specific announcement is being radiated, and, for example, to effect switching in the receiver, for example by releasing a muting circuit, or changing-over from reproduction from tape to the tuner, an announcement recognition (AR) frequency is AM modulated on the 57 kHz subcarrier. The AR frequencies differ from the RR frequencies, and, for example, are in the order of from between just above 120 Hz to about 200 Hz.

The RR frequency, thus, which modulates the 57 kHz subcarrier, characterizes the particular transmitter, or the reception region or range thereof. The RR frequency differs from transmitter to transmitter, or from region, or reception range, to region. Under ordinary conditions, the subcarrier is AM modulated by the RR frequency with 60% modulation.

During radiation of an announcement, the RR modulation is dropped to about 30%, and the AR modulation, which is amplitude modulated on the 57 kHz subcarrier, is provided with a degree of modulation of 60%, so that the overall modulation of the subcarrier will be about 90%. The relationships of modulation, and the respective systems, are described in detail in the referenced Eilers and Brägas applications.

The signal received by the antenna 1 is amplified and demodulated in the radio frequency (RF)/intermediate frequency (IF) stage 2. The output terminal 2' of the RF/IF stage thus will have the utilization modulation of the transmitter, to which the stage 2 was tuned appear therat.

The utilization modulation will contain, besides the audio information, the 57 kHz subcarrier which is amplitude modulated by the AR and RR signal, as set forth above. A detector 3, including a filter, is provided to filter the 57 kHz subcarrier from the signal at terminal 2'.

The signal at terminal 2' is also applied to an audio stage 4, which may include an audio discriminator, amplifier, and the like. The signal from audio stage 4 is applied to a muting stage 5 which, normally, is a switch muting the output from audio stage 4 unless the muting is released. The output from muting stage 5—applicable upon release of muting—is applied to a controlled switch 6 and, depending on position of the controlled switch, connected to an audio amplifier 7 for reproduction in a loudspeaker 8, or otherwise connected to provide for reproduction on tones from a tone generator 16 as will be described in detail below.

The 57 kHz filter and detector is connected to two separate recognition circuits, which include the respective filters for the RR frequencies range of the transmitters (20 to 120 Hz-filter 9) and for the AR frequency ($f_0$) characterizing a warning announcement (filter 10).

In accordance with a feature of the invention, a modulation degree detection stage 11 is provided which detects sudden change in the degree of modulation of the subcarrier by the RR signal. Circuits to detect the degree of modulation of a signal are known, and, for example, a suitable measuring circuit which will detect a change in modulation by the RR frequency from 60% to 30% is described in the referenced Eilers and Brägas application U.S. Ser. No. 319,655, now U.S. Pat. No. 4,450,589.

The degree-of-modulation detector 11, which may already be present in the system, provides a pulse, each time the modulation degree drops, to a memory 12. Memory 12, typically, is a flip-flop (FF) which is SET by receiving a SET pulse at the terminal S from the detector 11. The output of the FF 12 is connected to an inverter 13—or a negative output from the FF 12 can be used—and the inverted output from the FF 12 is connected to an AND-gate 14. The second input to the AND-gate 14 is connected to the output of a timing stage 15. The timing stage 15 is also connected to the reset input R of the FF 12. The timing stage 15, for example, may be a ring counter or shift register having its output connected back to its input. A slight time delay—not shown—is connected between the output of the timing stage 15 and the reset input R of the FF 12 to permit a new cycle of the timing stage 15 to start before the FF 12 is reset; in other words; the FF 12 is reset shortly after the start of a new cycle of timing stage 15.

The AND-gate 14 is connected to a tone generator 16; any other indicator output unit may be used. A manually operated switch 17 is also connected to the tone generator 16 to permit disconnecting the tone generator.

OPERATION

Let it be assumed that no abrupt change of RR signal has been detected by the circuit or stage 11, so that the FF 12 remains in its RESET state. This places a 1-signal on the output from the inverter 13 on the AND-gate 14. Let it further be assumed that the timing stage 15 has reached the end of its cycle and is about to start a new cycle. The output from the timing stage will provide a 1-signal to the second input of the AND-gate 14, thus enabling the tone generator. Accordingly, the output from the tone generator will be applied to the lower terminal of the controlled switch 6 which, normally, is in the position not shown in the drawing, that is, through-connected to the output from the tone generator 16. Consequently, audio amplifier 7 will amplify the tones from tone generator 16, providing a warning output that, during the preceding timing period of the timing stage 15, no pulse has been received which would have caused the FF 12 to become set, that is, no decrease in modulation has been detected by the detector stage 11. Energization of the tone generator 16, and its output, thus provides an indication that the receiver is not ready to receive warning or emergency announcements, since no abrupt change of RR signal modulation degree associated with such warning or announcements have been recorded.

The output of the tone generator 16 is connectable via the controlled switch 6 through the audio amplifier 7 to the loudspeaker 8. The switch 6, thus, is so connected with the output of the FF 12 that the muting stage 5 is connected with the audio amplifier 7 as soon as FF 12 is changed to SET state, that is, as soon as the first decrease in modulation of the RR signal is detected within one time period of the cycling time of the timing stage 12.

As soon as such a change-over of modulation is detected—which is a sudden jump or change of the degree of modulation—the receiver is capable of receiving warning or emergency announcements if, at the same time, the muting stage is released, which is done by detecting the warning announcement recognition frequency ($f_0$) in the AR detector and filter stage 10.

The switch 6, thus, is changed over from connection to the tone generator to connection to the muting stage as soon as the detector 11 detects a change in degree of RR modulation, causing the FF 12 to become SET. The switch 6 is changed over to connect the tone generator 16 as soon as the FF 12 is RESET at the end of a timing cycle of the timing stage 15. Thus, if the FF 12 does not receive a pulse up to the termination of the time of the timing cycle of the timing stage 5, the timing stage 5 will provide a pulse, with its last timing pulse, to connect the tone generator 16. Tone generator 16 can be disabled by opening the switch 17.

The control input to the muting stage 5 is connected, as well known, to the output of the AR detector and filter 10. The control circuit provides for release of muting only if a warning announcement intended for all listeners, that is, intended to be decoded by the AR detector and filter, is sensed.

The present invention is based essentially on generation of switching pulses which are determined by change in modulation of the RR signal, in the detector 11, and stored in the FF 12, to check if at least one such pulse is received during the timing period of the timing stage 15. Thus, the capability by the receiver to receive warning or emergency announcements is monitored, even if no such warning or emergency announcement has been radiated for a substantial period of time.

Any one abrupt change in the RR signal modulation degree will generate a pulse which will be stored in the FF 12 and prevent connection of the tone generator 16, due to inversion by the inverter 13.

The timing period of the timing stage is preferably set for 24 hours. If the system is connected as shown, it will have the advantage that the tone generator 16 will be connected—if at all—always at the same time of the day, since the start of a timing cycle will be independent of reception of an announcement, that is, change of the degree of modulation of the RR signl. Preferably, the start of the timing interval by the timing stage 15 should be manually operator controllable, for example by suitable energization, at a given time, of the terminal 15′ when the timing stage is first enabled. A combination of operator-selected time of generation of the timing signal, for example set by the operator at the time the vehicle in which the radio may be installed is ordinarily used, and a predetermined time period for the timing stage 15 is also possible, for example by disabling the tone generator 16 if it has not been manually interrupted by the switch 17 within a predetermined period of time after its first energization, e.g. 15 minutes, for reenergization at a time selected by the terminal 15′, for example in accordance with the type of simple circuit used in digital alarm clocks or alarm watches.

Various changes and modifications may be made within the scope of the inventive concept.

I claim:

1. Radio receiver having
an RF/IF/demodulator stage (1, 2);
means (3) for separating-out a modulated auxiliary subcarrier from an output audio intelligence signal of the RF/IF/demodulator stage and detecting a modulation signal on said subcarrier;
means (10) for filtering said modulation signal to provide an announcement recognition (AR) modulation frequency signal, if the subcarrier is modulated by said AR modulation frequency signal;
means (9) for filtering a region or radio station recognition (RR) modulation frequency signal having a frequency differing from the AR modulation frequency;
a muting circuit (5) coupled to said AR signal filter means inhibiting passage of said output audio intelligence signal from the RF/IF demodulator stage in the absence of an AR signal;
and comprising, in accordance with the invention, a reception-readiness monitoring circuit comprising
means (11) coupled to the RR frequency signal filtering means (9) for recognizing the degree of modulation of the RR frequency signal as modulated on the subcarrier (57 kHz) and providing an RR change output signal if the degree of modulation changes abruptly;
a memory element (12) controlled by the degree of modulation recognition means (11) and storing receipt of an RR change output signal;
timing means (13, 14, 15) connected to the memory and controlling the memory to provide a read-out signal indicative of failure to store an RR change output signal upon elapse of a timing period;
and indicator means (16, 6) providing an indicator output if the read-out signal from the timing means is received.

2. Receiver according to claim 1, wherein the degree of modulation recognition means recognizes a substantial decrease in the degree of modulation of the subcarrier (57 kHz) by the RR frequency signal.

3. Receiver according to claim 1, wherein the timing means (13, 14, 15) includes
a timing stage (15) providing a timing output signal after a predetermined time period and a logic circuit (13, 14) associating said timing output signal with an output signal from the memory element (12) to provide said read-out signal to the indicator means.

4. Receiver according to claim 3, wherein the indicator means comprises a tone generator (16);
and a transfer switch means (6) is provided connecting the tone generator (16) to an audio amplifier and reproducer (7, 8) of the receiver if the memory element does not store receipt of a region recognition modulation degree change output signal after elapse of said timing period.

5. Receiver according to claim 1, further including a transfer switch (6) selectively connecting an audio amplifier and reproducer (7, 8) of the receiver to:

(a) said muting circuit (5); or (b) the indicator means (16);

said indicator means comprising an audio tone generator;

and wherein the transfer switch is connected to and controlled by the memory element (12) to connect the indicator means to the audio amplifier and reproducer stage upon failure to store an RR change output signal upon elapse of a predetermined timing period, as determined by said timing means.

6. In a radio signalling system, in which a radiated carrier wave is frequency modulated with both on intelligence signal and an amplitude modulated subcarrier (57 kHz), wherein the subcarrier is amplitude modulated, selectively, with a region recognition (RR) frequency signal in a first low frequency range, and an announcement recognition (AR) frequency signal in a seond low frequency range, and wherein when the AR modulation frequency signal is impressed on the sub-carrier, the degree of modulation of the RR frequency signal responsively decreases.

a method comprising the steps of recognizing the degree of modulation of the RR frequency signal, and providing an RR change output signal if the degree of modulation changes abruptly;

storing a representation of an abrupt change of modulation degree of the RR frequency signal;

detecting the presence or absence of said stored representation within a predetermined time period;

and providing an output indication signal if no such representation is present within the time period.

* * * * *